(No Model.)
N. TACCONE.
CLIPPER.
No. 446,823. Patented Feb. 17, 1891.
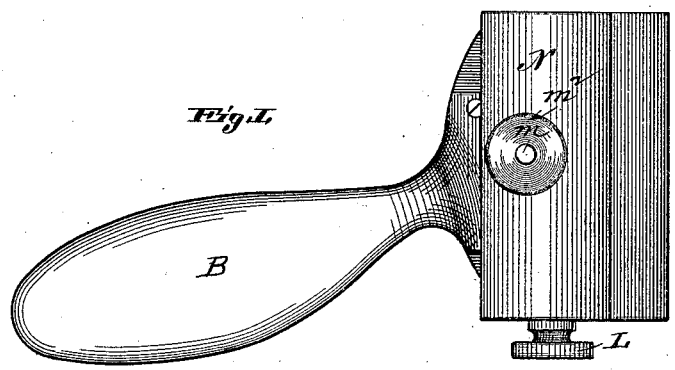
Fig. 1.
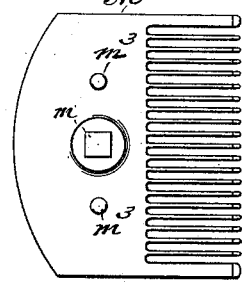
Fig. 8.
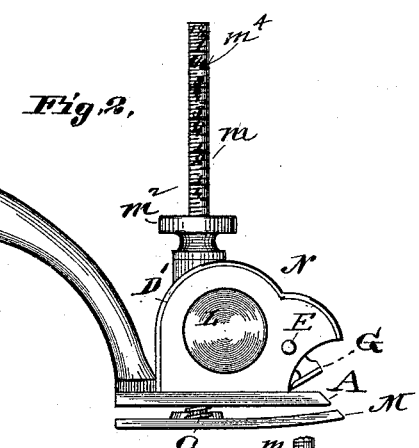
Fig. 2.
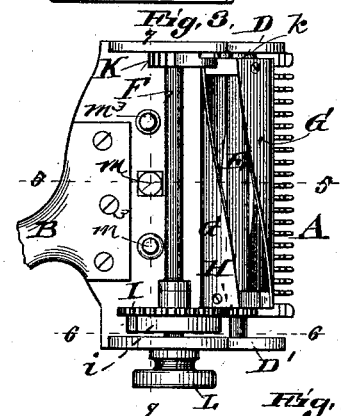
Fig. 3. Fig. 4.
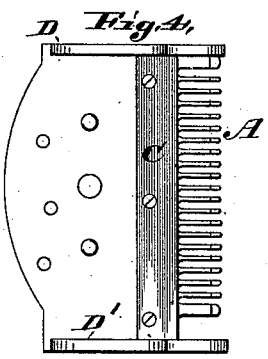
Fig. 5.
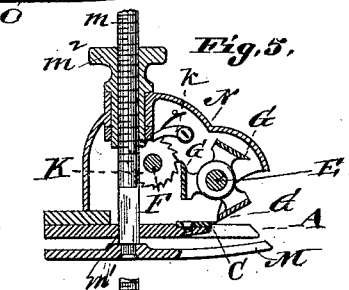
Fig. 6.
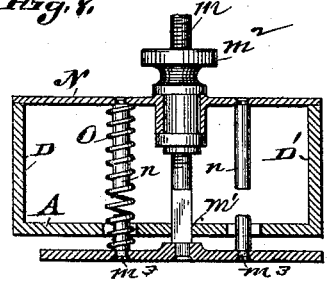
Fig. 7.
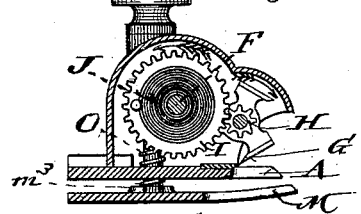
Attest:
Charles Pickles
J. Bonville
Inventor
Nicholas Taccone
by C. D. Moody
his atty
THE NORRIS PETERS CO., PHOTO-LITHO., WASHINGTON, D. C.

UNITED STATES PATENT OFFICE.

NICHOLAS TACCONE, OF BIRMINGHAM, ALABAMA.

CLIPPER.

SPECIFICATION forming part of Letters Patent No. 446,823, dated February 17, 1891.

Application filed August 15, 1890. Serial No. 362,116. (No model.)

*To all whom it may concern:*

Be it known that I, NICHOLAS TACCONE, of Birmingham, Alabama, have made a new and useful Improvement in Clippers, of which the following is a full, clear, and exact description.

This invention relates to improvements in devices known in the trade, &c., as "clippers;" and the novelty in the present instance consists in the construction of the several parts and in their combination as a whole, all substantially as is hereinafter set forth and claimed, aided by the annexed drawings, making part of this specification, in which—

Figure 1 is a plan of the clipper; Fig. 2, a side elevation thereof; Fig. 3, a plan, the cover being removed; Fig. 4, a plan of the comb having the stationary shears attached; Fig. 5, a vertical section on the line 5 5 of Fig. 3; Fig. 6, a vertical section on the line 6 6 of Fig. 3; Fig. 7, a vertical section on the line 7 7 of Fig. 3. Fig. 8 is a plan of the removable comb or gage-plate.

The same letters of reference denote the same parts.

A represents the principal comb. The handle B is attached to it.

C represents a stationary cutting-blade attached to the comb. At its sides, respectively, the comb is provided with uprights D D', in which are journaled two shafts E and F, as shown. The shaft E is provided with one or more cutting blades or knives G G G and a pinion H. The shears extend spirally upon the shaft, substantially as shown. When the shaft E is rotated, its cutting blades or knives coact with the stationary cutting-blade C, and the desired clipping is thereby effected. The shaft E is driven by a gear I, loose upon the shaft F, as follows:

J represents a spring, one end of which is attached to the shaft F and the other end of which is attached to a case $i$, fastened to the gear I. The shaft F is also provided with a ratchet K, with which coacts a pawl $k$, that is pivoted to the upright D. By means of the handle L, with which the shaft F is provided, that shaft can be rotated and the spring J thereby wound. The pawl and ratchet prevent the shaft F from turning backward. On releasing the handle L the spring acts to cause the rotation of the case $i$ and gear I upon the shaft F. The motion of the gear is imparted to the pinion H and shaft E, and the cutting blades or knives G G are thereby caused to operate in combination with the stationary cutting-blade, and the operation continues until the spring has become unwound.

M represents a removable comb, which can be attached to the under side of the comb A and in such a manner as to provide an adjustable gage, to which end the comb M is provided with an upright screw-threaded rod $m$, which, when the comb M is attached, extends upward through an opening $m'$ in the comb A, and thence farther upward through and above the cover N used upon the device, substantially as shown, and above the cover, provided with a nut $m^2$, which bears upon the cover, but free to be rotated upon the rod. By turning the nut upon the rod the comb M can be raised or lowered with reference to the comb A, and the closeness of the clipping thereby regulated. The rod $m$, where it passes through the comb A, is squared, and the opening in the comb A is of corresponding shape. The comb M is also provided with pins $m^3 m^3$, which project upward through openings in the comb A, and the cover N on its under side is provided with downwardly-extended pins $n$ $n$, in line with the pins $m^3 m^3$, respectively. O O represent springs, arranged, as shown, upon the pins $m^3 n$. Their function is to produce an elastic downward pressure upon the comb M. When it is desired to dispense with the comb M, the nut $m^2$ is suitably turned to release the rod $m$, whereupon the comb M can be detached.

The rod $m$ in practice is made long enough to enable the comb M, if desired, to be adjusted for cutting the hair even an inch or two in length.

One or both of the uprights upon the comb, as well as any other parts of the device therefor required, are made detachable to enable the shears to be removed for sharpening. The rod $m$ is graduated, as indicated at $m^4$, to enable the adjustment of the gage M to be accurately determined.

This improvement is especially adapted to barbers' clippers; but I desire not to be wholly restricted to this particular form of clipper in carrying out the improvement.

I claim—

1. The combination, in a clipper, of the stationary comb, the cover, the removable adjustable comb, the screw-threaded rod and its nut bearing in said cover, the springs and the pins, the latter projecting, respectively, from said cover and from said removable comb, and arranged end to end and bearing on said springs intermediately of said stationary and removable combs, substantially as specified.

2. The combination of the stationary comb, the cover, the removable comb, the graduated screw-threaded rod and its nut, said rod being connected to the removable comb and having the angular portion passing through a corresponding opening in the main comb, and said nut having a sleeve connection with said cover, adapting it to turn therein and to engage the screw-thread of said rod, substantially as set forth.

Witness my hand this 7th day of August, 1890.

NICHOLAS TACCONE.

Witnesses:
C. D. MOODY,
A. BONVILLE.